United States Patent
Ozawa (10) Patent No.: US 9,553,815 B2
(45) Date of Patent: Jan. 24, 2017

(54) REMOTE COMMUNICATION SYSTEM, SERVER APPARATUS, REMOTE COMMUNICATION METHOD, AND PROGRAM

(71) Applicant: NEC Corporation, Tokyo (JP)

(72) Inventor: Kazunori Ozawa, Tokyo (JP)

(73) Assignee: NEC Corporation, Tokyo (JP)

(*) Notice: Subject to any disclaimer, the term of this patent is extended or adjusted under 35 U.S.C. 154(b) by 11 days.

(21) Appl. No.: 14/419,347

(22) PCT Filed: Aug. 22, 2013

(86) PCT No.: PCT/JP2013/072456
§ 371 (c)(1),
(2) Date: Feb. 3, 2015

(87) PCT Pub. No.: WO2014/030714
PCT Pub. Date: Feb. 27, 2014

(65) Prior Publication Data
US 2015/0195208 A1    Jul. 9, 2015

(30) Foreign Application Priority Data
Aug. 24, 2012   (JP) .................................. 2012-184722

(51) Int. Cl.
*H04L 1/00* (2006.01)
*H04L 12/825* (2013.01)
*H04M 3/36* (2006.01)

(52) U.S. Cl.
CPC .............. *H04L 47/25* (2013.01); *H04M 3/36* (2013.01)

(58) Field of Classification Search
CPC ......... H04L 47/70; H04L 47/72; H04L 47/74; H04L 47/78; H04L 47/80; H04L 45/22; H04L 49/25; H04L 49/256; H04M 2215/42; H04W 40/00; H04W 40/02
(Continued)

(56) References Cited

U.S. PATENT DOCUMENTS 6,216,006 B1* 4/2001 Scholefield ......... H04L 12/5695
                                              455/450
6,643,496 B1* 11/2003 Shimoyama ........ H04L 43/0894
                                              370/232
(Continued)

FOREIGN PATENT DOCUMENTS

CN    1416244 A    5/2003
CN    1685671 A    10/2005
(Continued)

OTHER PUBLICATIONS

International Search Report corresponding to PCT/JP2013/072456, dated Sep. 17, 2013 (5 pages).
(Continued)

*Primary Examiner* — Dady Chery
(74) *Attorney, Agent, or Firm* — Wilmer Cutler Pickering Hale and Dorr LLP (57) ABSTRACT

A server apparatus recognizes start of a voice call including the first terminal based on an operation signal received from the first terminal. The server apparatus allows a packet storing voice data to go through to the first terminal when the packet is received from a second terminal connected via the network in a case where start of the voice call is recognized. The server apparatus estimates a bandwidth of the network based on a first response packet sent from the first terminal in response to a packet sent to the first terminal, calculates a bit rate of the voice call according to the estimated bandwidth, and notifies the first terminal of the calculated bit
(Continued)

rate. The first terminal switches a bit rate of the voice call according to the notified bit rate.

20 Claims, 3 Drawing Sheets

(58) Field of Classification Search
USPC .................. 370/229, 230, 235, 351–358
See application file for complete search history.

(56) References Cited

U.S. PATENT DOCUMENTS

| | | | |
|---|---|---|---|
| 2003/0086370 | A1 | 5/2003 | Woo |
| 2006/0067324 | A1 | 3/2006 | Kim et al. |
| 2006/0182092 | A1* | 8/2006 | Kodaka .................. H04L 12/66 370/352 |
| 2007/0025263 | A1* | 2/2007 | Dunlap ............... H04L 43/0882 370/252 |
| 2008/0117930 | A1* | 5/2008 | Chakareski ............ H04L 47/10 370/465 |
| 2008/0144610 | A1 | 6/2008 | Kakiuchi |
| 2008/0212575 | A1* | 9/2008 | Westberg ............. H04L 1/0026 370/356 |
| 2009/0083432 | A1* | 3/2009 | Saito ...................... H04L 47/10 709/231 |
| 2009/0115839 | A1 | 5/2009 | Kodaka |
| 2010/0034082 | A1 | 2/2010 | Ikeda et al. |
| 2010/0150171 | A1 | 6/2010 | Rodbro et al. |
| 2010/0195521 | A1 | 8/2010 | Wanstedt et al. |
| 2010/0322234 | A1 | 12/2010 | Kodaka |
| 2011/0103375 | A1 | 5/2011 | Kodaka |
| 2011/0128868 | A1 | 6/2011 | Wurm et al. |
| 2011/0307604 | A1* | 12/2011 | Wakuda .................. H04L 65/80 709/224 |

FOREIGN PATENT DOCUMENTS

| | | |
|---|---|---|
| CN | 1825779 A | 8/2006 |
| CN | 101218774 A | 7/2008 |
| GB | 2466208 A | 6/2010 |
| JP | 2006-254411 A | 9/2006 |
| JP | 2008-153774 A | 7/2008 |
| JP | 2009-060425 A | 3/2009 |
| JP | 2011-259239 A | 12/2011 |

OTHER PUBLICATIONS

Taiwan Office Action with English translation issued in corresponding Taiwan Application No. 102130277, dated Dec. 15, 2015, 9 pages.
Extended European Search Report issued by the European Patent Office for Application No. 13830304.5 dated Mar. 23, 2016 (7 pages).
Updated European Search Report issued by the European Patent Office for Application No. 13830304.5 dated Apr. 28, 2016 (6 pages).
Chinese Office Action issued by The State Intellectual Property Office of The People's Republic of China for Application No. 201380044504.7 dated Jun. 1, 2016 (19 pages).

* cited by examiner

REMOTE COMMUNICATION SYSTEM, SERVER APPARATUS, REMOTE COMMUNICATION METHOD, AND PROGRAM

FIELD

Reference to Related Application

This application is a national stage application of International Application No. PCT/JP2013/072456, entitled "Remote Communication System, Server Apparatus, Remote Communication Method, and Program," filed on Aug. 22, 2013, which is based upon and claims the benefit of the priority of Japanese Patent Application No. 2012-184722 filed on Aug. 24, 2012. The disclosures of each of which is are incorporated herein in its their entirety by reference thereto.

The present invention relates to a remote communication system, server apparatus, and remote communication method, and to a remote communication system, server apparatus, remote communication method, and program enabling a terminal such as a mobile terminal to have a voice call with a connection destination terminal by remotely accessing the server apparatus via a network.

BACKGROUND

In recent years, many corporations have started to use thin client terminals in order to ensure a high level of security. A thin client terminal operates a virtual client on a server apparatus as if to operate an actual terminal. The virtual client generates screen information by operating an application and forwards the generated screen information to a thin client terminal. The thin client terminal displays the forwarded screen information on a screen. At this time, no data remains with the thin client terminal. Therefore, there is an advantage that confidential information and corporate information will not be leaked out even if a thin client terminal is lost.

For instance, Patent Literature 1 describes a thin client system that uses a thin client terminal as a telephone terminal.

PATENT LITERATURE 1

Japanese Patent Kokai Publication No. JP2006-254411A

SUMMARY

Technical Problem

The disclosure of Patent Literature listed above is incorporated herein in its entirety by reference thereto. The following analysis is given by the present inventor.

When one makes a VoIP (Voice over Internet Protocol) voice call using a thin client terminal, delays are often much longer, compared with VoIP calls not using a thin client terminal, making the calls more difficult.

According to the thin client technology, a virtual client on a server apparatus receives a voice data packet sent by a thin client terminal, which created the packet by compressing and encoding a voice signal, and performs processing such as decoding the voice data, re-encoding the voice data, and repacketizing the voice data. Therefore, if a network delay and the delay added in each process are combined, the total end-to-end delay will be greatly long (for instance, one second or longer), possibly disrupting voice calls.

Further, the network bandwidth of a mobile network or the Internet is relatively narrow and the bandwidth changes over time according to traffic congestion. When the bandwidth becomes narrow, voice data is retained in the network, creating problems such as a longer arrival time for the voice data to reach a thin client terminal and a larger jitter fluctuation.

Therefore, shortening the delay in a voice call using a thin client terminal and achieving a high-quality voice call that addresses the changes in the network bandwidth are demanded.

According to a first aspect of the present invention, there is provided a server apparatus comprising a control unit that recognizes start of a voice call including a first terminal connected via a network based on an operation signal received from the first terminal. The server apparatus comprises a packet through unit that allows a packet storing voice data to go through to the first terminal when the packet is received from a second terminal connected via the network in a case where start of the voice call is recognized. Further, the server apparatus comprises an estimation unit that estimates a bandwidth of the network based on a first response packet sent from the first terminal in response to a packet sent to the first terminal, calculates a bit rate of the voice call according to the estimated bandwidth, and notifies the first terminal of the calculated bit rate.

According to a second aspect of the present invention, there is provided a remote communication system. The remote communication system comprises: a server apparatus; and a first terminal connected to the server apparatus via a network. The server apparatus comprises a control unit that recognizes start of a voice call including the first terminal based on an operation signal received from the first terminal. Further, the server apparatus comprises a packet through unit that allows a packet storing voice data to go through to the first terminal when the packet is received from a second terminal connected via the network in a case where start of the voice call is recognized. Moreover, the server apparatus comprises an estimation unit that estimates a bandwidth of the network based on a first response packet sent from the first terminal in response to a packet sent to the first terminal, calculates a bit rate of the voice call according to the estimated bandwidth, and notifies the first terminal of the calculated bit rate. The first terminal switches a bit rate of the voice call according to the notified bit rate.

According to a third aspect of the present invention, there is provided a remote communication method. The remote communication method comprises, by a computer, recognizing start of a voice call including a first terminal connected via a network based on an operation signal received from the first terminal. Further, the method comprises, by the computer, allowing a packet storing voice data to go through to the first terminal when the packet is received from a second terminal connected via the network in a case where start of the voice call is recognized. Moreover, the remote communication method comprises, by the computer, estimating a bandwidth of the network based on a first response packet sent from the first terminal in response to a packet sent to the first terminal. Further, the remote communication method comprises, by the computer, calculating a bit rate of the voice call according to the estimated bandwidth and notifying the first terminal of the calculated bit rate.

According to a fourth aspect of the present invention, there is provided a program that causing a computer to execute recognizing start of a voice call including a first terminal connected to the computer via a network based on an operation signal received from the first terminal. Further, the program causes the computer to execute allowing a packet storing voice data to go through to the first terminal when the packet is received from a second terminal connected via the network in a case where start of the voice call is recognized. Moreover, the program causes the computer to execute estimating a bandwidth of the network based on a first response packet sent from the first terminal in response to a packet sent to the first terminal. Further, the program causes the computer to execute calculating a bit rate of the voice call according to the estimated bandwidth and notifying the first terminal of the calculated bit rate. Note also that the program can be provided as a program product stored in a non-transitory computer-readable storage medium.

The present invention provides the following advantage, but not restricted thereto. According to the remote communication system, server apparatus, remote communication method, and program relating to the present invention, the delay in a voice call using a thin client terminal can be shortened, and a high-quality voice call that addresses changes in the network bandwidth can be achieved.

PREFERRED MODES

In the present disclosure, there are various possible modes, which include the following, but not restricted thereto. First, a summary of an exemplary embodiment will be given. Note that drawing reference signs in the summary are given solely for facilitating understanding and are not intended to limit the present invention to the modes shown.

Figure 1:
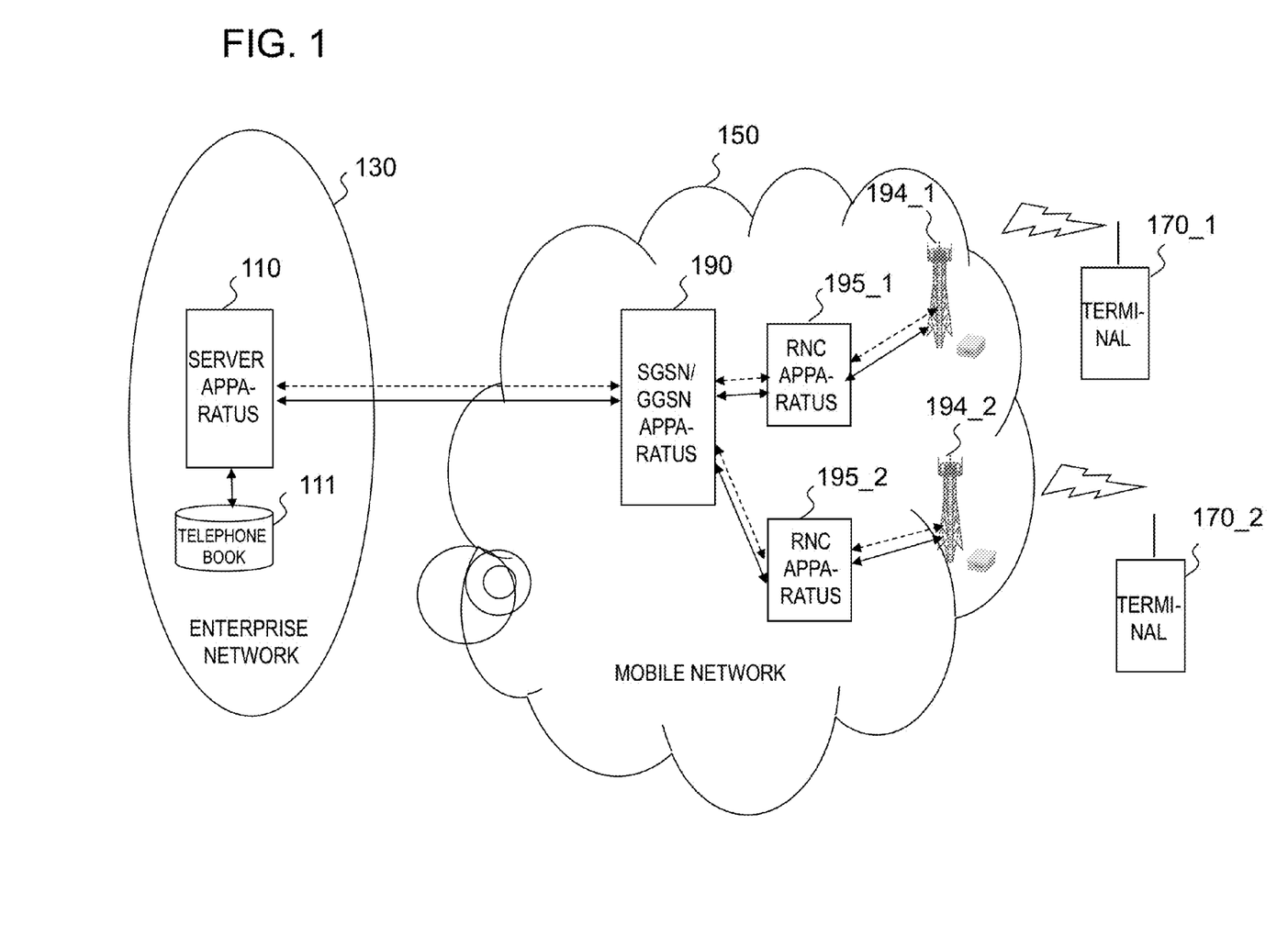
FIG. 1 is a block diagram showing an example of the connection configuration of a remote communication system relating to a first exemplary embodiment.

FIG. 1 is a drawing showing the configuration of a remote communication system relating to an exemplary embodiment. With reference to FIG. 1, the remote communication system comprises a server apparatus (110) and a first terminal (170_1) connected to the server apparatus (110) via a network (for instance a mobile network 150).

The server apparatus (110) recognizes start of a voice call including the first terminal (170_1) based on an operation signal received from the first terminal (170_1). For instance, the server apparatus (110) may recognize start of the voice call when the operation signal is a signal for launching an application for the voice call application on a virtual client provided in the server apparatus (110). Further, the server apparatus (110) allows a packet storing a voice data to go through to the first terminal (170_1) when the packet is received from a second terminal (170_2) connected via the network (150) in a case where start of the voice call is recognized. Further, the server apparatus (110) estimates a bandwidth of the network (150) based on a response packet sent from the first terminal (170_1) in response to a packet sent to the first terminal (170_1), calculates a bit rate of the voice call according to the estimated bandwidth, and notifies the first terminal (170_1) of the calculated bit rate. The first terminal (170_1) switches a bit rate of the voice call according to the notified bit rate.

By having the server apparatus let a packet related to a voice call go through, a high-speed exchange of the packet between the terminals becomes possible. Further, by having the server apparatus measure the bandwidth of the network and notify the terminals of the bit rate according to the measurement result, it becomes possible to adjust the bit rate of a voice call according to the bandwidth of the network. Therefore, according to such a remote communication system, a high-quality voice call addressing changes in the network bandwidth can be achieved while the delay in a voice call using a thin client terminal are shortened.

Further, the following modes are possible in the present invention.

(Mode 1)
A server apparatus may be the server apparatus according to the first aspect.

(Mode 2)
The control unit may recognize start of the voice call when the operation signal is a signal for launching an application for the voice call on a virtual client provided in the server apparatus.

(Mode 3)
The first response packet may include first information indicating a data size included in a packet sent from the server apparatus to the first terminal, a time when the first terminal receives the packet, and a data size included in the first response packet. Further, the estimation unit may estimate a bandwidth in a downlink direction from the server apparatus to the first terminal based on the first information, and estimate a bandwidth in an uplink direction from the first terminal to the server apparatus based on the first information and a time when the server apparatus receives the first response packet.

(Mode 4)
The estimation unit may calculate a bit rate of the voice call in the downlink direction from the server apparatus to the first terminal according to the bandwidth in the downlink direction from the server apparatus to the first terminal and notify the first terminal of the calculated bit rate of the voice call in the downlink direction. Further, the estimation unit may calculate a bit rate of the voice call in the uplink direction from the first terminal to the server apparatus according to the bandwidth in the uplink direction from the first terminal to the server apparatus and notify the first terminal of the calculated bit rate of the voice call in the uplink direction.

(Mode 5)
The packet through unit may allow a packet storing voice data to go through to the second terminal when receiving the packet from the first terminal in a case where start of the voice call is recognized. Further, the estimation unit may estimate a bandwidth of the network based on a second response packet sent from the second terminal in response to a packet sent to the second terminal, calculate a bit rate of the voice call according to the estimated bandwidth, and notify the second terminal of the calculated bit rate.

(Mode 6)
The second response packet may include second information indicating a data size included in a packet sent from the server apparatus to the second terminal, a time when the second terminal receives the packet, and a data size included in the second response packet. Further, the estimation unit may estimate a bandwidth in a downlink direction from the server apparatus to the second terminal based on the second information, and estimate the bandwidth in an uplink direction from the second terminal to the server apparatus based on the second information and a time when the server apparatus receives the second response packet.
(Mode 7)
The estimation unit may calculate a bit rate of the voice call in the downlink direction from the server apparatus to the second terminal according to the bandwidth in the downlink direction from the server apparatus to the second terminal and notify the second terminal of the calculated bit rate of the voice call in the downlink direction. Further, the estimation unit may calculate a bit rate of the voice call in the uplink direction from the second terminal to the server apparatus according to the bandwidth in the uplink direction from the second terminal to the server apparatus and notify the second terminal of the calculated bit rate of the voice call in the uplink direction.
(Mode 8)
The estimation unit may notify the calculated bit rate based on CMR (Codec Mode Request) or SDP (Session Description Protocol).
(Mode 9)
A remote communication system may be the remote communication system according to the second aspect.
(Mode 10)
A remote communication method may be the remote communication method according to the third aspect.
(Mode 11)
In the remote communication method, the computer may recognize start of the voice call when the operation signal is a signal for launching an application for the voice call on a virtual client provided in the server apparatus.
(Mode 12) In the remote communication method, the first response packet may include first information indicating a data size included in a packet sent from the server apparatus to the first terminal, a time when the first terminal receives the packet, and a data size included in the first response packet. Further, the computer may estimate a bandwidth in a downlink direction from the server apparatus to the first terminal based on the first information, and estimate a bandwidth in an uplink direction from the first terminal to the server apparatus based on the first information and a time when the server apparatus receives the first response packet.
(Mode 13)
The remote communication method may comprise, by the computer, calculating a bit rate of the voice call in the downlink direction from the server apparatus to the first terminal according to the bandwidth in the downlink direction from the server apparatus to the first terminal and notifying the first terminal of the calculated bit rate of the voice call in the downlink direction. Further, the remote communication method may comprise, by the computer, calculating a bit rate of the voice call in the uplink direction from the first terminal to the server apparatus according to the bandwidth in the uplink direction from the first terminal to the server apparatus and notifying the first terminal of the calculated bit rate of the voice call in the uplink direction.
(Mode 14)
The remote communication method may comprise, by the computer, allowing a packet storing voice data to go through to the second terminal when the packet is received from the first terminal in a case where start of the voice call is recognized. Further, the remote communication method may comprise, by the computer, estimating a bandwidth of the network based on a second response packet sent from the second terminal in response to a packet sent to the second terminal. Moreover, the remote communication method may comprise, by the computer, calculating a bit rate of the voice call according to the estimated bandwidth and notifying the second terminal of the calculated bit rate.
(Mode 15)
In the remote communication method, the second response packet may include second information indicating a data size included in a packet sent from the server apparatus to the second terminal, a time when the second terminal receives the packet, and a data size included in the second response packet. Further, the computer may estimate a bandwidth in a downlink direction from the server apparatus to the second terminal based on the second information, and estimate a bandwidth in an uplink direction from the second terminal to the server apparatus based on the second information and a time when the server apparatus receives the second response packet.
(Mode 16)
The remote communication method may comprise, by the computer, calculating a bit rate of the voice call in the downlink direction from the server apparatus to the second terminal according to the bandwidth in the downlink direction from the server apparatus to the second terminal and notifying the second terminal of the calculated bit rate of the voice call in the downlink direction. Further, the remote communication method may comprise, by the computer, calculating a bit rate of the voice call in the uplink direction from the second terminal to the server apparatus according to the bandwidth in the uplink direction from the second terminal to the server apparatus and notifying the second terminal of the calculated bit rate of the voice call in the uplink direction.
(Mode 17)
There is provided a program that may cause a computer to execute recognizing start of a voice call including a first terminal connected to the computer via a network based on an operation signal received from the first terminal. Further, the program may cause the computer to execute allowing a packet storing voice data to go through to the first terminal when the packet is received from a second terminal connected via the network in a case where start of the voice call is recognized. Moreover, the program may cause the computer to execute estimating a bandwidth of the network based on a first response packet sent from the first terminal in response to a packet sent to the first terminal. Further, the program may cause the computer to execute calculating a bit rate of the voice call according to the estimated bandwidth and notifying the first terminal of the calculated bit rate.

First Exemplary Embodiment

A remote communication system relating to a first exemplary embodiment will be described with reference to the drawings. FIG. 1 shows a configuration example of the remote communication system relating to the present exemplary embodiment. FIG. 1 shows a configuration in which a 3G ($3^{rd}$ Generation) mobile packet network is used as a network, and an SGSN/GGSN (Serving GPRS (General Packet Radio Service) Support Node/Gateway GPRS Support Node) apparatus is used as a packet forwarding apparatus. Note that other networks such as an LTE (Long Term Evolution) mobile network, WiFi (Wireless Fidelity) network, NGN (Next Generation Network), and the Internet may be used.

In FIG. 1, a voice call is made by the terminal 170_1 to the terminal 170_2 using the server apparatus 110 in a case where the terminal 170_1 performs data forwarding using a thin client by connecting to the server apparatus 110 provided in an enterprise network 130. In the present exemplary embodiment, a telephone book required to make a call is held by the server apparatus 110 of the thin client. In this case, the terminal 170_1 does not have to own the telephone book, and security for telephone numbers and usernames can be ensured when the terminal 170_1 is lost.

In FIG. 1, the telephone book 111 in which usernames and telephone numbers are registered is provided for and connected to the server apparatus 110. In order for the terminal 170_1 to connect to the server apparatus 110 and start a voice call, screen data generate by starting a voice call VoIP application on a virtual client of the server apparatus 110 is forwarded from the server apparatus 110 to the terminal 170_1. The terminal 170_1 decodes and displays the forwarded screen data. The user of the terminal 170_1 makes a voice call to the terminal 170_2 while referring to the displayed screen on the terminal 170_1.

When the terminal 170_1 launches a voice call VoIP application on a virtual client of the server apparatus 110 in order to start a voice call, an operation signal or a packet storing an operation signal for starting the VoIP application is sent from the terminal 170_1 to the server apparatus 110. Upon receiving the operation signal or the packet storing an operation signal, the server apparatus 110 has a control unit recognize it to be a voice call, generates a screen by starting the voice call VoIP application on the virtual client, encodes the screen information, and forwards the information from the server apparatus 110 to the terminal 170_1. The terminal 170_1 decodes the forwarded screen information and displays it on the screen of the terminal 170_1. The end user of the terminal 170_1 performs an operation, as the next action, such as selecting a username and telephone number as the call destination.

Further, when the screen includes audio, an audio signal accompanying the screen is processed via a path different from the one for the voice call. In other words, after being captured by a screen capture unit, the signal is compressed and encoded by an audio encoder unit into a compressed/encoded stream, and sent to the terminal 170_1 as a different packet than the voice call using a predetermined protocol.

After these processes, the terminal 170_1 sends a packet storing a session control message using a known session control protocol and a packet storing a bit stream obtained by having the terminal 170_1 compress and encode a voice signal. In this case, SIP (Session Initiation Protocol) is used as the session control protocol. Note that any session control protocol other than SIP may be used.

These packets reach a base station 194_1 in the mobile network 150 to which the terminal 170_1 belongs, and further reach the server apparatus 110 in the enterprise network 130 via an RNC (Radio Network Controller) apparatus 195_1 and the SGSN/GGSN apparatus 190.

Figure 2:
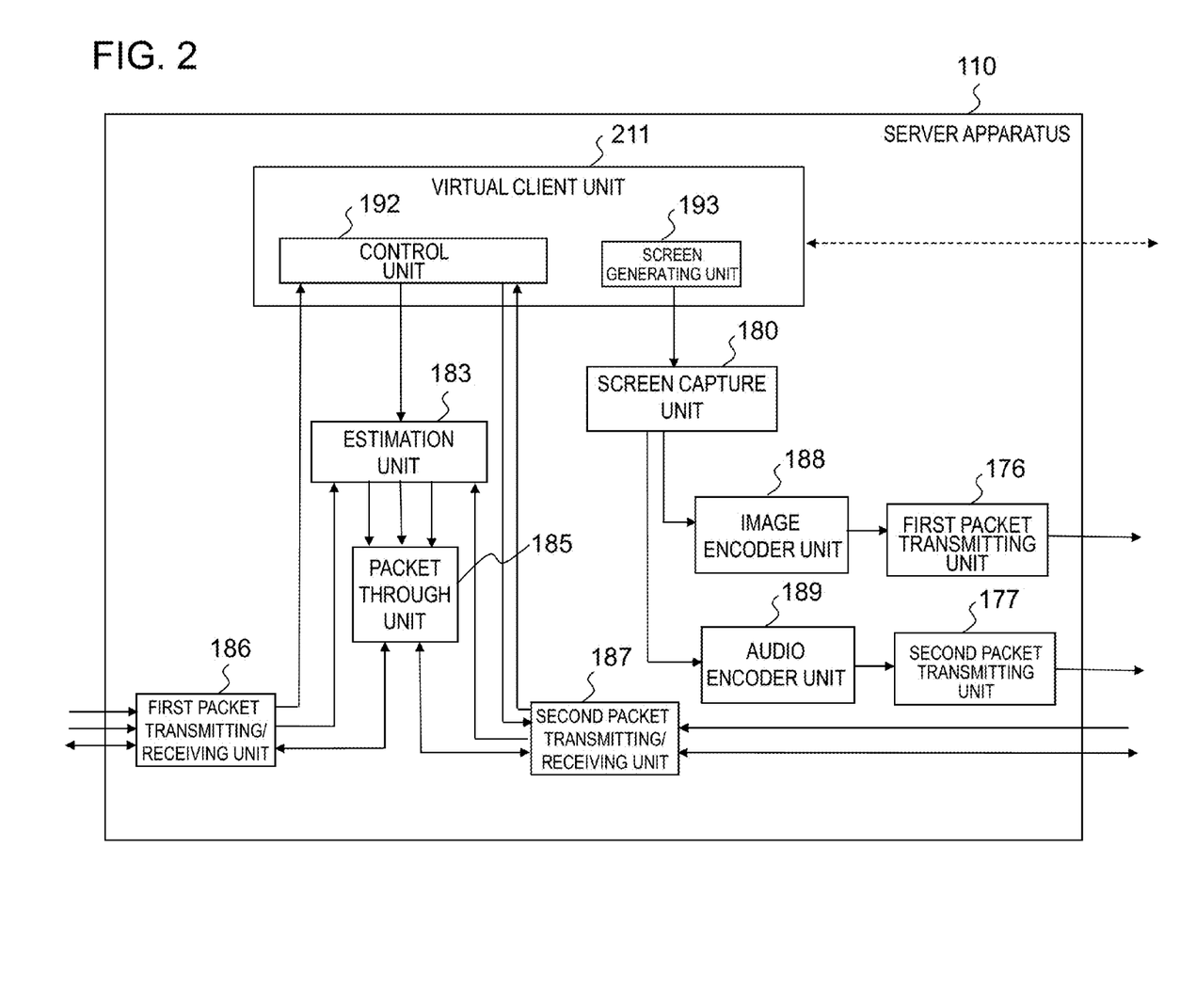
FIG. 2 is a block diagram showing the configuration of a server apparatus in the remote communication system relating to the first exemplary embodiment.

FIG. 2 is a block diagram showing a configuration example of the server apparatus 110. With reference to FIG. 2, the configuration of the server apparatus 110 will be described. In FIG. 2, the server apparatus 110 comprises a virtual client unit 211, the screen capture unit 180, an image encoder unit 188, an audio encoder unit 189, a first packet transmitting unit 176, a second packet transmitting unit 177, a first packet transmitting/receiving unit 186, a second packet transmitting/receiving unit 187, a packet through unit 185, and an estimation unit 183.

Although this is not shown in FIG. 2, the virtual client unit 211 operates on a guest OS (Operating System) in a virtual environment on a host OS. In this case, a known OS can be used as the host OS or the guest OS. As an example, Linux (registered trademark) is used as the host OS and Android is used as the guest OS below. Note that Windows (registered trademark) may be used as the guest OS as well.

With reference to FIG. 2, the virtual client unit 211 comprises the control unit 192 and a screen generating unit 193. When starting a voice call, the terminal 170_1 in FIG. 1 stores an operation signal for launching a voice call VoIP application on the virtual client in a packet and sends the packet to the server apparatus 110. The first packet transmitting/receiving unit of the server apparatus 110 receives the packet storing the operation signal, extracts the operation signal from the packet, and outputs the signal to the control unit 192.

When receiving the operation signal and recognizing it to be a start signal for a voice call VoIP application, the control unit 192 executes the voice call VoIP application. The screen generating unit 193 generates a screen using screen information on the basis of the execution of the voice call VoIP application and outputs the screen to the screen capture unit 180.

The screen capture unit 180 captures the generated screen at predetermined screen resolution and frame rate and outputs the result to the image encoder unit 188.

The image encoder unit 188 compresses and encodes the received screen at predetermined screen resolution, bit rate, and frame rate using a predetermined encoder, derives a compressed/encoded stream, and outputs the stream to the first packet transmitting unit 176. For instance, compression encoding methods such as H.264, MPEG-4 (Moving Picture Experts Group 4), and JPEG 2000 (Joint Photographic Experts Group 2000) can be used.

The first packet transmitting unit 176 stores the compressed/encoded stream received from the image encoder unit 188 into a predetermined packet and outputs the packet to the SGSN/GGSN apparatus 190 in FIG. 1. In this case, RTP/UDP/IP (Real-time Transport Protocol/User Datagram Protocol/Internet Protocol), UDP/IP, TCP/IP (Transmission Control Protocol/Internet Protocol), etc., can be used as the packet protocol. UDP/IP is used here as an example.

Next, the terminal 170_1 receives the compressed/encoded stream for the screen, decodes it at predetermined screen resolution and frame rate, and displays the screen on a display unit of the terminal 170_1.

Next, the control unit 192 reads the telephone number (the telephone number of the terminal 170_2 in this case) and username of the call destination from the telephone book 111 in FIG. 1, and generates a screen using the screen generating unit 193. The image encoder unit 188 compresses and encodes the generated screen and sends the result to the terminal 170_1.

The user of the terminal 170_1 selects a user and telephone number while referring to the received screen on the terminal 170_1, and starts a voice call. At this time, the terminal 170_1 sends a packet storing a SIP message to the server apparatus 110, and then sends a packet storing a stream obtained by compressing and encoding a voice signal.

The server apparatus 110 reduces the delay in a voice call by processing the packet related to the voice call using a different path from the audio accompanying the screen.

In the case of a voice call, out of the packets received from the terminal 170_1, the first packet transmitting/receiving unit outputs the packet storing a SIP message to the control unit 192, outputs the packet storing the compressed/encoded stream of the voice to the packet through unit 185, and outputs the response packet to the estimation unit 183. In this case, voice compression coding methods such as G.711, G.711.1, G.729, G.722.2, AMR-NB (Adaptive Multi-Rate Narrowband), AMR-WB (Adaptive Multi-Rate Wideband), etc., can be used as the compression encoding method for the voice at the terminal 170_1. AMR_NB is used here as an example.

Out of the packets received from the terminal 170_2 in FIG. 1, the second packet transmitting/receiving unit 187 outputs the packet storing a SIP message to the control unit 192, outputs the packet storing the compressed/encoded stream of the voice to the packet through unit 185, and outputs the response packet to the estimation unit 183.

Upon receiving the operation signal from the first packet transmitting/receiving unit, the control unit 192 performs the following operations.

(1) The control unit 192 analyzes the operation signal and starts a voice call VoIP application when the signal is for starting a voice call.

(2) In the case of a voice call, the control unit 192 receives a SIP message from the first packet transmitting/receiving unit.

(3) From the VoIP application, the control unit 192 obtains the telephone number of the call destination selected by the end user, derives the IP address of the call destination from the telephone number, rewrites the destination IP address of the received SIP message to the derived IP address of the call destination, and notifies the second packet transmitting/receiving unit 187 of the rewritten SIP message and the IP address of the call destination.

(4) The control unit 192 instructs the estimation unit 183 to estimate the bandwidths of the network connected to the terminal 170_1 in uplink and downlink directions using the response packet from the first packet transmitting/receiving unit and the response packet from the second packet transmitting/receiving unit 187. Further, the control unit 192 instructs the estimation unit 183 to estimate the bandwidths of the network connected to the terminal 170_2 in uplink and downlink directions. Further, the control unit 192 instructs the estimation unit 183 to calculate four bit rates on the basis of each of the four bandwidths and notify the packet through unit 185 thereof.

(5) The control unit 192 instructs the packet through unit 185 to let a packet storing the compressed/encoded stream of a voice call, received by the first packet transmitting/receiving unit, go through and output the packet to the second packet transmitting/receiving unit 187. Similarly, the control unit 192 instructs the packet through unit 185 to let a packet storing the compressed/encoded stream of a voice call, received by the second packet transmitting/receiving unit 187, go through and output the packet to the first packet transmitting/receiving unit.

The estimation unit 183 receives information included in the response packet from the first packet transmitting/receiving unit and estimates the bandwidth BW_1 of the network to which the terminal 170_1 is connected. Similarly, the estimation unit 183 receives information included in the response packet from the second packet transmitting/receiving unit 187 and estimates the bandwidth BW_2 of the network to which the terminal 170_2 is connected.

The response packet from the terminal 170_1 includes at least the following three pieces of information. In other words, the response packet includes (1) a data size D(j) included in a packet sent from the server apparatus 110 to the terminal 170_1 at a time j; (2) a time R(j) when the terminal 170_1 receives this packet; and (3) a data size P(m) included in a response packet sent from the terminal 170_1 to the server apparatus 110.

Similarly, the response packet from the terminal 170_2 includes at least the following three pieces of information. In other words, the response packet includes (1) a data size D(j) included in a packet sent from the server apparatus 110 to the terminal 170_2 at a time j; (2) a time R(j) when the terminal 170_2 receives this packet; and (3) a data size P(m) included in a response packet sent from the terminal 170_2 to the server apparatus 110.

The estimation unit 183 estimates the bandwidth of the network using the three pieces of information included in the response signal packet.

First, the estimation unit 183 estimates the bandwidth of the network to which the terminal 170_1 is connected in the downlink direction using Mathematical Formulas (1) and (2).

$$D(j)/W=R(j)-R(j-1) \qquad (1)$$

In Math. (1), W denotes the bandwidth estimated value. D(j) indicates the data size of a jth packet sent from the first packet transmitting/receiving unit to the terminal 170_1. R(j) represents the time when the terminal 170_1 receives the jth packet.

Next, the estimation unit 183 smoothes the bandwidth estimated value W over time calculated in Math. (1) on the basis of Math. (2).

$$BW(n)=(1-\beta)BW(n-1)+\beta W \qquad (2)$$

Here, BW(n) denotes the bandwidth estimated value after smoothing at an nth time, and β is a constant within a range of 0<β<1.

Next, the estimation unit 183 derives the bandwidth estimated value in the uplink direction as follows. The response signal packet includes the data size P(m) sent by the terminal 170_1 in the uplink direction. The estimation unit 183 derives the bandwidth W' in the uplink direction using Math. (3).

$$P(m)/W'=T(m)-T(m-1) \qquad (3)$$

In Math. (3), T(m) denotes the time when the server apparatus 110 receives the response signal packet.

Next, the estimation unit 183 smoothes W' over time and deems BW'(n), the value after the smoothing, to be the bandwidth estimated value of the uplink direction.

$$BW'(n)=(1-\beta)BW'(n-1)+\beta W' \qquad (4)$$

Next, the estimation unit 183 calculates the bit rate C(n) in the downlink direction according to Math. (5) and (6) at each predetermined time using the bandwidth estimated value BW(n) smoothed using Math. (2).

$$C(n)=(1-\gamma)C(n-1)+\gamma BW(n) \qquad (5)$$

$$C(n) \leq BW(n) \qquad (6)$$

Here, C(n) denotes the bit rate at the nth time. γ is a constant within a range of 0<γ<1.

Similarly, the estimation unit 183 calculates the bit rate C'(n) in the uplink direction according to Math. (7) and (8) using the bandwidth estimated value BW'(n) smoothed using Math. (4).

$$C'(n)=(1-\gamma)C'(n-1)+\gamma BW'(n) \qquad (7)$$

$$C'(n) \leq BW'(n) \qquad (8)$$

The estimation unit 183 estimates the bandwidth estimated value of the network connected to the terminal 170_2 as it did the bandwidth estimated value of the network connected to the terminal 170_1. In other words, the estimation unit 183 estimates the bandwidth estimated value of the network connected to the terminal 170_2 using three pieces of information included in the response signal packet obtained from the second packet transmitting/receiving unit 187 and on the basis of Math. (1) to (4). The estimation unit 183 calculates the bandwidth estimated value in the downlink direction on the basis of Math. (1) and (2), and calculates the bandwidth estimated value in the uplink direction on the basis of Math. (3) and (4). Further, the estimation unit 183 calculates the bit rate in the downlink direction using Math. (5) and (6), and calculate the bit rate in the uplink direction using Math. (7) and (8).

Next, having received an instruction from the control unit 192 to let a packet go through, the packet through unit 185 receives a packet storing the compressed/encoded stream of a voice call from the first packet transmitting/receiving unit 186 and outputs the received packet to the second packet transmitting/receiving unit 187, letting it pass through without any delay. Further, having received an instruction from the control unit 192 to let a packet go through, the packet through unit 185 receives a packet storing the compressed/encoded stream of a voice call from the second packet transmitting/receiving unit 187 and outputs the received packet to the first packet transmitting/receiving unit 186, letting it pass through without any delay.

From the estimation unit 183, the packet through unit 185 receives the downlink and uplink bit rates of the network to which the terminal 170_1 is connected, and receives the downlink and uplink bit rates of the network to which the terminal 170_2 is connected. The packet through unit 185 instructs the first packet transmitting/receiving unit to notify the terminal 170_1 of the downlink and uplink bit rates of the network to which the terminal 170_1 is connected by including a CMR (Codec Mode Request) of AMR-NB in the payload header of the packet. Similarly, the packet through unit 185 instructs the second packet transmitting/receiving unit 187 to notify the terminal 170_2 of the downlink and uplink bit rates of the network to which the terminal 170_2 is connected by including a CMR of AMR-NB in the payload header of the packet.

Further, when the downlink and uplink bit rates are notified, other methods such as SDP (Session Description Protocol) may be used instead of the CMR.

When receiving the IP address of the call destination and the SIP message from the control unit 192 and the packet storing the compressed/encoded stream of the voice call from the packet through unit 185, the second packet transmitting/receiving unit 187 sends the SIP message to the terminal 170_2 via the SGSN/GGSN apparatus 190, etc.

Further, when SDP is used in the notifications of the uplink and downlink bit rates, these notifications are included in SIP/SDP. The CMR can be included in the payload header as the notification of the uplink and downlink bit rates for the packet storing the compressed/encoded stream of the voice call. Further, the second packet transmitting/receiving unit 187 changes the protocol of the packet as necessary, and then outputs the packet to the terminal 170_2 via the SGSN/GGSN apparatus 190, etc. In this case, the protocol can be changed to, for instance, the RTP/UDP/IP protocol, the UDP/IP protocol, and the TCP/IP protocol.

In the present exemplary embodiment, the mobile network 150 is a 3G mobile network. The mobile network 150, however, may be an LTE (Long Term Evolution) mobile network. Further, a fixed network, NGN (Next Generation Network), W-LAN (Wireless Local Area Network), or the Internet may be used as the mobile network 150. A smartphone and tablet may be used as the terminals 170_1 and 170_2. Further, a fixed terminal may be used as the terminals 170_1 and 170_2 instead of a mobile terminal. Moreover, the server apparatus 110 may be provided for a mobile network or fixed network instead of an enterprise network.

Second Exemplary Embodiment

Figure 3:
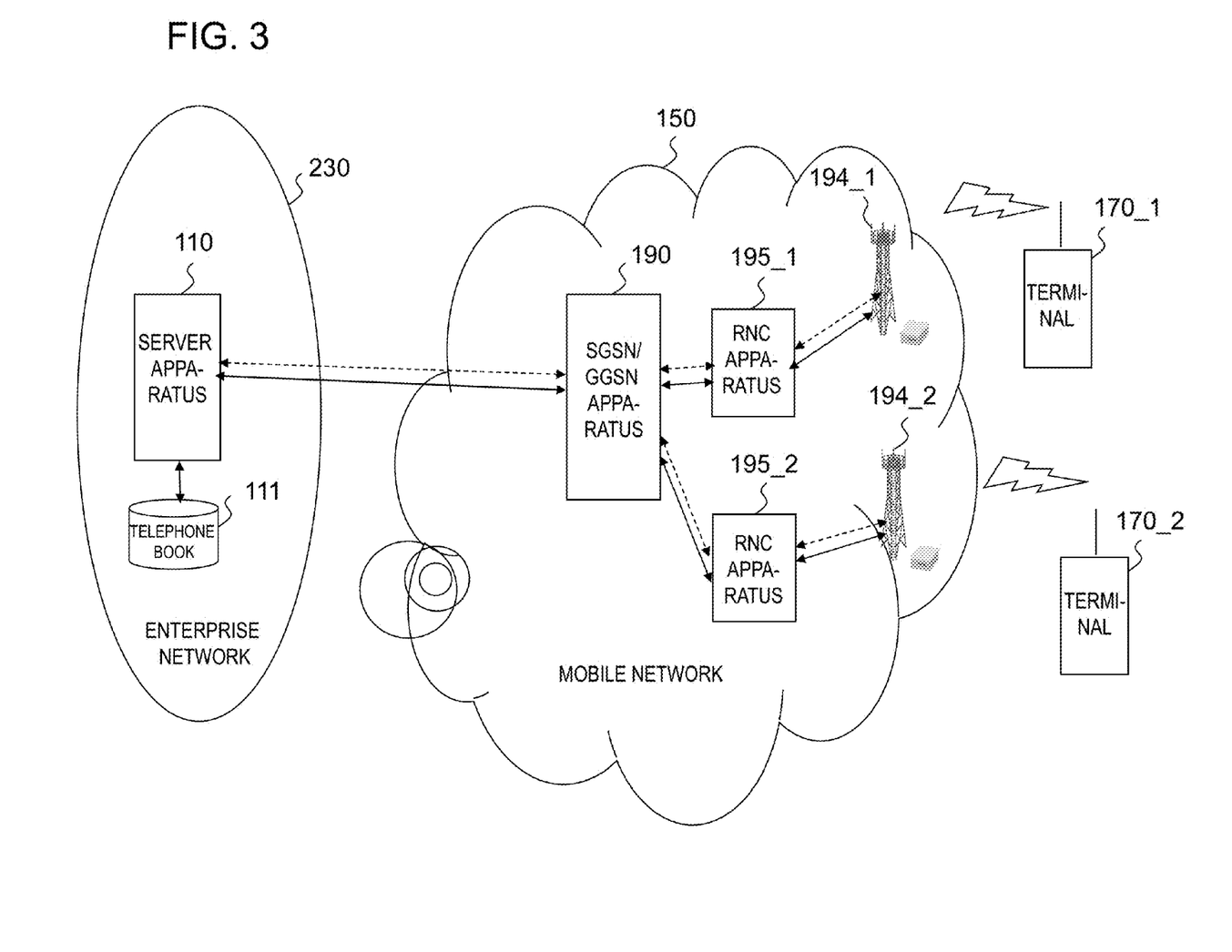
FIG. 3 is a block diagram showing an example of the connection configuration of a remote communication system relating to a second exemplary embodiment.

A remote communication system relating to a second exemplary embodiment will be described with reference to the drawings. FIG. 3 is a block diagram showing a configuration example of the remote communication system relating to the present exemplary embodiment.

In FIG. 3, a configuration in which the server apparatus 110 is provided in a cloud network 230 and the terminals 170_1 and 170_2 are connected to the server apparatus 110 via the mobile network 150 is employed. Here, since elements in FIG. 3 with the same numbers as those in FIG. 1 have the same functions as those in FIG. 1, the explanation thereof will be omitted.

Further, the mobile network 150 may be an LTE (Long Term Evolution) mobile network. Moreover, a fixed network, NGN (Next Generation Network), W-LAN (Wireless Local Area Network), or the Internet may be used as the mobile network 150. A smartphone and tablet may be used as the terminals 170_1 and 170_2. Further, a fixed terminal may be used as the terminals 170_1 and 170_2 instead of a mobile terminal. Moreover, the server apparatus 110 may be provided for a mobile network or fixed network instead of an enterprise network.

According to the remote communication system relating to the exemplary embodiment above, a voice call between a terminal and a connection destination terminal becomes possible even when the network bandwidth changes. Particularly, according to the exemplary embodiment above, the problem that the delay in a VoIP voice call using a thin client is much longer than that in a normal VoIP call not using a thin client can be solved. This is because, in the server apparatus, the control unit recognizes a voice call by receiving an operation signal or packet from a terminal, and in a case where a voice call is recognized, a packet storing voice data sent from the terminal can be sent to the destination without any delay via a different path on the basis of an instruction from the control unit by letting the packet go through.

Further, according to the exemplary embodiment above, when the bandwidth of a mobile network or the Internet changes over time due to traffic congestion, the bit rate is calculated by having the server apparatus estimate the bandwidth, and the bit rate can be controlled according to the bandwidth by controlling the terminal by notifying the bit rate thereto. As a result, problems such as a long delay time at a client terminal and a large jitter fluctuation can be solved.

The disclosure of the aforementioned Patent Literature is incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof 110: server apparatus
111: telephone book
130: enterprise network
150: mobile network
170_1, 170_2: terminal
176: first packet transmitting unit
177: second packet transmitting unit
180: screen capture unit
183: estimation unit
185: packet through unit
186: first packet transmitting/receiving unit
187: second packet transmitting/receiving unit
188: image encoder unit
189: audio encoder unit
190: SGSN/GGSN apparatus
192: control unit
193: screen generating unit
194_1, 194_2: base station
195_1, 195_2: RNC apparatus
211: virtual client unit
230: cloud network

The invention claimed is:

1. A server apparatus, comprising:
a control unit that recognizes start of a voice call including a first terminal connected via a network based on an operation signal received from the first terminal;
a packet through unit that allows a packet storing voice data to go through to the first terminal when the packet is received from a second terminal connected via the network in a case where start of the voice call is recognized;
an estimation unit that estimates a bandwidth of the network based on a first response packet sent from the first terminal in response to a packet sent to the first terminal, calculates a bit rate of the voice call according to the estimated bandwidth, and notifies the first terminal of the calculated bit rate; and
the first response packet includes first information indicating a data size included in a packet sent from the server apparatus to the first terminal, a time when the first terminal receives the packet, and a data size included in the first response packet.

2. The server apparatus according to claim 1, wherein the control unit recognizes start of the voice call when the operation signal is a signal for launching an application for the voice call on a virtual client provided in the server apparatus.

3. The server apparatus according to claim 1, wherein the estimation unit estimates a bandwidth in a downlink direction from the server apparatus to the first terminal based on the first information, and estimates a bandwidth in an uplink direction from the first terminal to the server apparatus based on the first information and a time when the server apparatus receives the first response packet.

4. The server apparatus according to claim 3, wherein the estimation unit calculates a bit rate of the voice call in the downlink direction from the server apparatus to the first terminal according to the bandwidth in the downlink direction from the server apparatus to the first terminal and notifies the first terminal of the calculated bit rate of the voice call in the downlink direction, and the estimation unit calculates a bit rate of the voice call in the uplink direction from the first terminal to the server apparatus according to the bandwidth in the uplink direction from the first terminal to the server apparatus and notifies the first terminal of the calculated bit rate of the voice call in the uplink direction.

5. A server apparatus, comprising:
a control unit that recognizes a start of a voice call including a first terminal connected via a network based on an operation signal received from the first terminal;
a packet through unit that allows a packet storing voice data to go through to the first terminal when the packet is received from a second terminal connected via the network in a case where start of the voice call is recognized; and
an estimation unit that:
estimates a bandwidth of the network based on a first response packet sent from the first terminal in response to a packet sent to the first terminal,
calculates a bit rate of the voice call according to the estimated bandwidth, and
notifies the first terminal of the calculated bit rate, wherein
the packet through unit allows a packet storing voice data to go through to the second terminal when receiving the packet from the first terminal in a case where start of the voice call is recognized,
the estimation unit estimates a bandwidth of the network based on a second response packet sent from the second terminal in response to a packet sent to the second terminal, calculates a bit rate of the voice call according to the estimated bandwidth, and notifies the second terminal of the calculated bit rate, and
the second response packet includes second information indicating a data size included in a packet sent from the server apparatus to the second terminal, a time when the second terminal receives the packet, and a data size included in the second response packet.

6. The server apparatus according to claim 5, wherein the estimation unit estimates a bandwidth in a downlink direction from the server apparatus to the second terminal based on the second information, and estimates the bandwidth in an uplink direction from the second terminal to the server apparatus based on the second information and a time when the server apparatus receives the second response packet.

7. The server apparatus according to claim 6, wherein the estimation unit calculates a bit rate of the voice call in the downlink direction from the server apparatus to the second terminal according to the bandwidth in the downlink direction from the server apparatus to the second terminal and notifies the second terminal of the calculated bit rate of the voice call in the downlink direction, and the estimation unit calculates a bit rate of the voice call in the uplink direction from the second terminal to the server apparatus according to the bandwidth in the uplink direction from the second terminal to the server apparatus and notifies the second terminal of the calculated bit rate of the voice call in the uplink direction.

8. The server apparatus according to claim 1, wherein the estimation unit notifies the calculated bit rate based on CMR (Codec Mode Request) or SDP (Session Description Protocol).

9. A remote communication system, comprising:
a server apparatus; and
a first terminal connected to the server apparatus via a network, wherein the server apparatus comprises:
- a control unit that recognizes start of a voice call including the first terminal based on an operation signal received from the first terminal;
- a packet through unit that allows a packet storing voice data to go through to the first terminal when the packet is received from a second terminal connected via the network in a case where start of the voice call is recognized; and
- an estimation unit that estimates a bandwidth of the network based on a first response packet sent from the first terminal in response to a packet sent to the first terminal, calculates a bit rate of the voice call according to the estimated bandwidth, and notifies the first terminal of the calculated bit rate, wherein the first response packet includes first information indicating a data size included in a packet sent from the server apparatus to the first terminal, a time when the first terminal receives the packet, and a data size included in the first response packet, and
- the first terminal switches a bit rate of the voice call according to the notified bit rate.

10. A remote communication method, comprising:
- by a computer, recognizing start of a voice call including a first terminal connected via a network based on an operation signal received from the first terminal;
- allowing a packet storing voice data to go through to the first terminal when the packet is received from a second terminal connected via the network in a case where start of the voice call is recognized;
- estimating a bandwidth of the network based on a first response packet sent from the first terminal in response to a packet sent to the first terminal, wherein the first response packet includes first information indicating a data size included in a packet sent from the server apparatus to the first terminal, a time when the first terminal receives the packet, and a data size included in the first response packet; and
- calculating a bit rate of the voice call according to the estimated bandwidth and notifying the first terminal of the calculated bit rate.

11. The remote communication method according to claim 10, wherein
the computer recognizes start of the voice call when the operation signal is a signal for launching an application for the voice call on a virtual client provided in the server apparatus.

12. The remote communication method according to claim 10, wherein
the computer estimates a bandwidth in a downlink direction from the server apparatus to the first terminal based on the first information, and estimates a bandwidth in an uplink direction from the first terminal to the server apparatus based on the first information and a time when the server apparatus receives the first response packet.

13. The remote communication method according to claim 12, comprising:
- by the computer, calculating a bit rate of the voice call in the downlink direction from the server apparatus to the first terminal according to the bandwidth in the downlink direction from the server apparatus to the first terminal and notifying the first terminal of the calculated bit rate of the voice call in the downlink direction; and
- calculating a bit rate of the voice call in the uplink direction from the first terminal to the server apparatus according to the bandwidth in the uplink direction from the first terminal to the server apparatus and notifying the first terminal of the calculated bit rate of the voice call in the uplink direction.

14. The remote communication method according to claim 10, comprising:
- by the computer, allowing a packet storing voice data to go through to the second terminal when the packet is received from the first terminal in a case where start of the voice call is recognized;
- estimating a bandwidth of the network based on a second response packet sent from the second terminal in response to a packet sent to the second terminal, wherein the second response packet includes second information indicating a data size included in a packet sent from the server apparatus to the second terminal, a time when the second terminal receives the packet, and a data size included in the second response packet; and
- calculating a bit rate of the voice call according to the estimated bandwidth and notifying the second terminal of the calculated bit rate.

15. The remote communication method according to claim 14, wherein
the computer estimates a bandwidth in a downlink direction from the server apparatus to the second terminal based on the second information, and estimates a bandwidth in an uplink direction from the second terminal to the server apparatus based on the second information and a time when the server apparatus receives the second response packet.

16. The remote communication method according to claim 15, comprising:
- by the computer, calculating a bit rate of the voice call in the downlink direction from the server apparatus to the second terminal according to the bandwidth in the downlink direction from the server apparatus to the second terminal and notifying the second terminal of the calculated bit rate of the voice call in the downlink direction; and
- calculating a bit rate of the voice call in the uplink direction from the second terminal to the server apparatus according to the bandwidth in the uplink direction from the second terminal to the server apparatus and notifying the second terminal of the calculated bit rate of the voice call in the uplink direction.

17. A non-transitory computer-readable recording medium, storing a program that cause a computer to execute:
- recognizing start of a voice call including a first terminal connected to the computer via a network based on an operation signal received from the first terminal;
- allowing a packet storing voice data to go through to the first terminal when the packet is received from a second terminal connected via the network in a case where start of the voice call is recognized;
- estimating a bandwidth of the network based on a first response packet sent from the first terminal in response to a packet sent to the first terminal, wherein the first response packet includes first information indicating a data size included in a packet sent from the server apparatus to the first terminal, a time when the first terminal receives the packet, and a data size included in the first response packet; and
- calculating a bit rate of the voice call according to the estimated bandwidth and notifying the first terminal of the calculated bit rate.

18. The non-transitory computer-readable recording medium according to claim 17, wherein
the program causes the computer to execute recognizing start of the voice call when the operation signal is a signal for launching an application for the voice call on a virtual client provided in the server apparatus.

19. The non-transitory computer-readable recording medium according to claim 17, wherein
the program causes the computer to execute estimating a bandwidth in a downlink direction from the server apparatus to the first terminal based on the first information, and estimating a bandwidth in an uplink direction from the first terminal to the server apparatus based on the first information and a time when the server apparatus receives the first response packet.

20. The non-transitory computer-readable recording medium according to claim 17, wherein
the program causes the computer to execute:
allowing a packet storing voice data to go through to the second terminal when the packet is received from the first terminal in a case where start of the voice call is recognized;
estimating a bandwidth of the network based on a second response packet sent from the second terminal in response to a packet sent to the second terminal, wherein the second response packet includes second information indicating a data size included in a packet sent from the server apparatus to the second terminal, a time when the second terminal receives the packet, and a data size included in the second response packet; and
calculating a bit rate of the voice call according to the estimated bandwidth and notifying the second terminal of the calculated bit rate.

* * * * *